(12) United States Patent
Orf et al.

(10) Patent No.: US 6,859,688 B1
(45) Date of Patent: Feb. 22, 2005

(54) DATA STRUCTURES, AND SYSTEMS TO CONFIGURE AVIONIC EQUIPMENT WITH PROFILE DATA

(75) Inventors: Roger A. Orf, Olathe, KS (US); Philip I. Straub, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 82 days.

(21) Appl. No.: 10/274,246

(22) Filed: Oct. 18, 2002

(51) Int. Cl.[7] .............................................. G05D 1/00
(52) U.S. Cl. ............................................. 701/3; 701/14
(58) Field of Search ............................... 701/3, 10, 17; 340/945; 342/26; 348/143, 148

(56) References Cited

U.S. PATENT DOCUMENTS

2003/0033059 A1 * 2/2003 Ebert et al. .................... 701/3
2003/0050745 A1 * 3/2003 Orton ............................ 701/3
2004/0059474 A1 * 3/2004 Boorman et al. ............. 701/14

* cited by examiner

Primary Examiner—Thomas G. Black
Assistant Examiner—Christine Behncke
(74) Attorney, Agent, or Firm—Devon A. Rolf

(57) ABSTRACT

Data structures and systems are provided for configuring avionic equipment with profile data. Profile data is defined, stored, and/or retrieved. The profile data is used to configure one or more display fields of the avionic equipment, display units of measure, identify flight plans, define map settings, set navigation fields, define communication transceiver spacing, define data/time setup, to configure one or more timers, alarms, and/or to configure other communication, navigation, or surveillance settings associated with avionic equipment. Furthermore, instances of the profile data are associated with unique identifiers for storage and retrieval purposes.

14 Claims, 3 Drawing Sheets

DATA STRUCTURES, AND SYSTEMS TO CONFIGURE AVIONIC EQUIPMENT WITH PROFILE DATA

CROSS-REFERENCE TO RELATED APPLICATIONS

This application is related to the following co-pending, commonly assigned U.S. patent applications: "Cockpit Instrument Panel Systems and Methods of Presenting Cockpit Instrument Data," Ser. No. 10/086,951; "Cockpit Control Systems and Methods of Controlling Data on Multiple Cockpit Instrument Panels," Ser. No. 10/086,929; "Cockpit Instrument Panel Systems and Methods with Redundant Critical Flight Data Display," Ser. No. 10/086,783; "Cockpit Display Systems and Methods of Presenting Data on Cockpit Displays," Ser. No. 10/086,598; "Cockpit Instrument Panel Systems and Methods with Variable Perspective Flight Display," Ser. No. 10/086,573; and "Customizable Cockpit Display Systems and Methods of Customizing the Presentation of Cockpit Data," Ser. No. 10/086,996, each of which disclosures are herein incorporated by reference in their entirety.

FIELD OF THE INVENTION

The present invention relates generally to methods, data structures, and systems for configuring avionic equipment, and in particular to identifying, creating, modifying, storing, and retrieving profile data used to configure one or more display fields, flight plans, map settings, navigation fields, communication transceiver spacing, date/time setup, displayed units of measure, timers, alarms, and/or other communication, navigation, or surveillance settings associated with avionic equipment.

BACKGROUND OF THE INVENTION

Modern commercial/private aircraft, as well as older aircraft, include a myriad of instrumentation panels associated with electronic devices having controls, displays, and software applications, which are used to present information to pilots and/or copilots during flight. The electronic devices, controls, displays and applications are interfaced together to form avionic equipment within the aircraft.

Conventionally, pilots/copilots access one or more interface devices of the avionic equipment prior to flight, in order to customize various information in preparation for their flights. Some of this information can be merely preferences desired by the pilots/copilots, such as desired field locations for presenting flight settings/options within a display. Other information is more functional, such as flight plans for scheduled flights. Moreover, some information is used to alter displayed units of measure (e.g., metric standard versus U.S. standard, and others), which are associated with displayed flight settings/options (including instrument readings).

Typically, when avionic equipment is powered down, the then-existing settings/options for the equipment are retained and re-provided when the equipment is subsequently powered up again. Thus, when one pilot/copilot takes over for a different pilot/copilot many of the initial provided settings/options require manual adjustment. This can be time consuming, tedious, and undesirable for pilots/copilots. Moreover, manual adjustment can be repetitively required each time the equipment is powered up.

Also, many larger airlines can require that some settings/options be used by their pilots/copilots for purposes of standardization, training, and/or safety concerns. Thus, administratively defined settings/options can be circumvented or avoided altogether, when pilots/copilots manually re-enter flight settings/options. This is so, because modifying flight settings/options for conventional avionic equipment is rigid and time consuming. Therefore, many administratively defined settings/options avoid widespread enforcement by the airlines or are manually changed by the pilots/copilots.

As is apparent to one skilled in the art, existing avionic equipment does not provide practical reusable settings/options. Moreover, since the settings/options are not easily modifiable, standard required flight settings/options can be more easily circumvented or avoided by pilots/copilots. Therefore, there exists a need to better create, modify, maintain, store, and retrieve flight settings/options for avionic equipment.

SUMMARY OF THE INVENTION

The above-mentioned problems, associated with initial configurations of avionic equipment, are addressed by the present invention and will be understood by reading and studying the following specification. Methods, data structures, and systems are provided for the improved creation, modification, maintenance, storage, and retrieval of profile data. In one embodiment, profile data represents flight settings/options associated with a unique identifier for use by specific administrators, pilots, or copilots. Instances of the profile data are created, modified, stored, and retrieved based on the unique identifier. Furthermore, the profile data is used to configure one or more display fields, flight plans, map settings, navigation fields, communication transceiver spacing, date/time setup, displayed units of measure, timers, alarms, and/or other communication, navigation, or surveillance settings associated with avionic equipment.

More specifically, and in one embodiment of the present invention, a method for configuring profile data in avionic equipment is provided. An identifier uniquely associated with the profile data is received. The identifier is used to acquire the profile data. Further, the avionic equipment is configured to present the profile data.

In still another embodiment of the present invention a profile data structure residing on a computer-readable medium and used to configure avionic equipment is presented. The profile data structure includes an identifier and tag data. The identifier uniquely identifies an instance of the profile data. The tag data is associated with data values for the instance. Furthermore, the tag data combined with the associated values is used to configure one or more display fields of the avionic equipment, identify units for one or more of the display fields, identify flight plans, define map settings, define communication transceiver spacing, define date/time setup, set navigation fields, timers, alarms, and/or other communication, navigation, or surveillance settings associated with avionic equipment.

In yet another embodiment of the present invention, a system to configure avionic equipment is described. The system includes a profile data template, an input interface application, and a configuration application. The input interface application is used to define an instance of profile data by using the profile data template, storing the instance, and retrieving the instance. The configuration application uses the instance of the profile data to configure one or more display fields of the avionic equipment, identify units for one or more of the display fields, identify flight plans, define map settings, define communication transceiver spacing, define date/time setup, set navigation fields, timers, alarms, and/or other communication, navigation, or surveillance settings associated with avionic equipment.

These and other embodiments, aspects, advantages, and features of the present invention will be set forth in part in the description which follows, and in part will become apparent to one of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION OF THE INVENTION

In the following detailed description of the invention, reference is made to the accompanying drawings which form a part hereof, and in which is shown, by way of illustration, specific embodiments in which the invention can be practiced. The embodiments are intended to describe aspects of the invention in sufficient detail to enable one of ordinary skill in the art to practice the invention. Other embodiments can be utilized and changes can be made without departing from the scope of the present invention. The following detailed description is, therefore, not to be taken in a limiting sense, and the scope of the present invention is defined only by the appended claims, along with the full scope of equivalents to which such claims are entitled.

As used herein the phrase "avionic equipment" refers to electronic devices, control dials, flight displays, and software/firmware which are interfaced together within an aircraft to provide communication, navigation, and/or surveillance information in order to assist a pilot/copilot of the aircraft on ground and during flight. In some embodiments, part of the avionic equipment is provided as a conventional Multifunction Display (MFD). In other embodiments, an additional Primary Flight Display (PFD) is also provided as part of the avionic equipment. Moreover, the use of the word pilot includes copilot throughout this disclosure.

Figure 1:
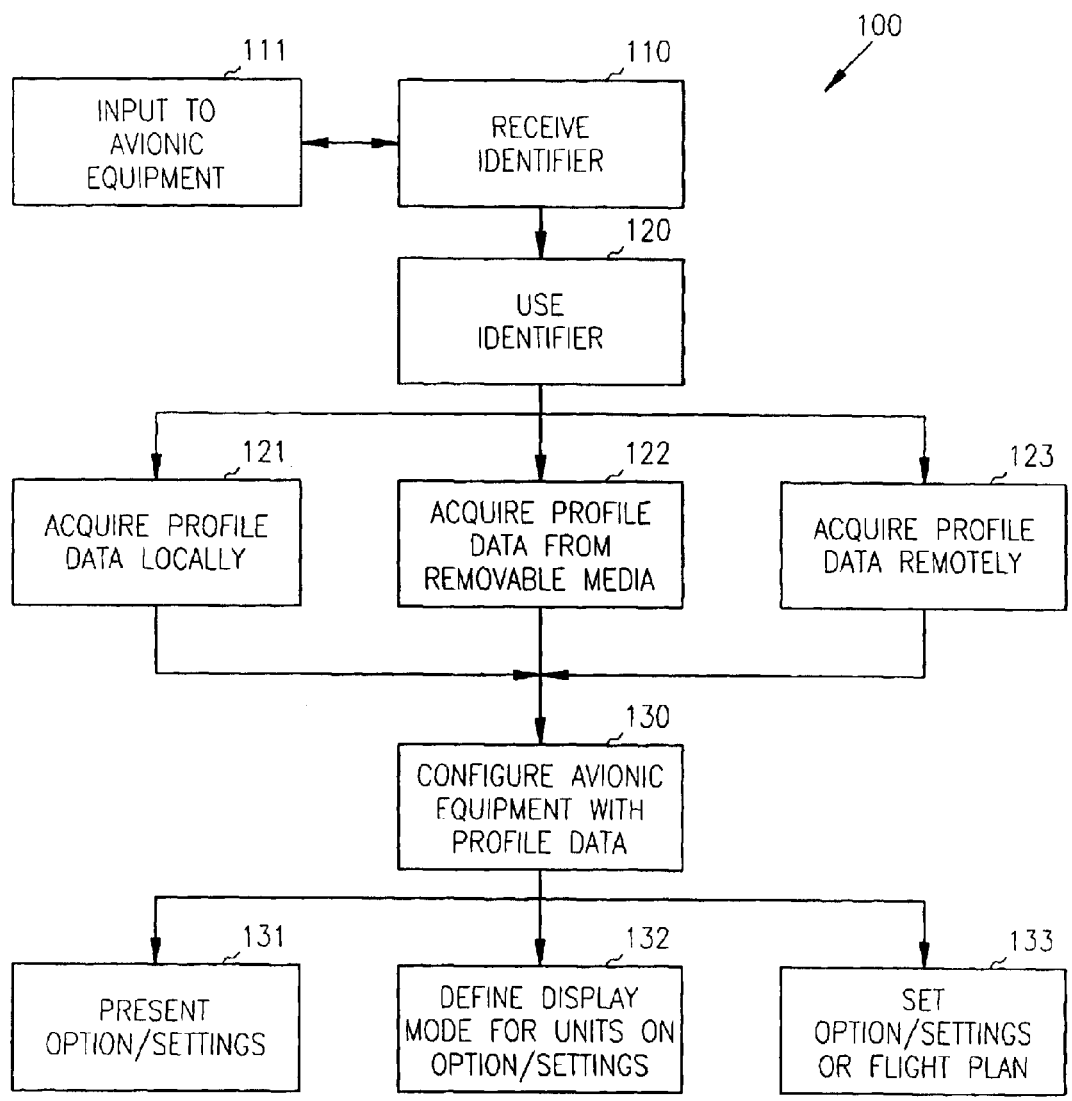
FIG. 1 is a flowchart of a method for configuring profile data in avionic equipment, according to the teachings of the present invention.

FIG. 1 illustrates a flowchart of one method 100 for configuring profile data in avionic equipment, according to the teachings of the present invention. In various embodiments of the present disclosure, the profile data is represented as a tagged/fielded electronic file, where the tags/fields identify the type of information being customized within the profile data and each tag/field is followed by a value representing the customized setting to apply with the defined type.

The combined tags/fields and values are used to initialize and customize avionic equipment. Some of these customized values include values that define the units of measure to display with avionic, navigation, and/or equipment settings/readings. Other values determine where within a display information is presented, initial settings for timers/alarms, spacing increments between transceiver communication frequencies, desired flight plans, map settings, date/time formats, and others.

The tags/fields of the profile data represent a schema for the profile data. Additionally, in some embodiments, this schema can include attributes for the tags/fields, such that some tags/fields can be set by an administrator as being optional, required, or non modifiable. In this way, airlines can create profile data schemas that conform to their individual policies, and schemas can be made to conform with any required Federal Aviation Airline (FAA) guidelines or rules. Furthermore, changes to the schema can be restricted to only authorized users, such as administrators who have proper authentication credentials to modify the schema.

With a generic schema for the profile data in place, different instances of the profile data is created, such that each instance includes a unique identifier that distinguishes it from other instances. Each instance conforms to the policies (e.g., attribute selection and tag syntaxes) of the generic schema but includes different values for the tags/fields. In some embodiments, the unique identifier is a user's name, such as a pilot's name. Of course as one skilled in the art readily appreciates, any unique identification that identifies an instance of profile data can be readily used with the present disclosure.

Furthermore, in some embodiments, a default instance of the profile data is initially provided when the avionic equipment is powered up. The avionic equipment is equipped with interface applications that identify the default profile data instance during a start up. This interface visually presents an initial splash screen to an administrator or a pilot, which identifies the default profile data instance by descriptive text on a display screen. Menu options are also presented permitting the administrator or pilot to change to a different profile data instance or to modify the default profile data instance by accessing one or more additional screens. Existing knobs, buttons, and/or controls can be used by the administrator or pilot to interact with the interface options with directions presented on the display screens by the interface applications.

Additionally, in one embodiment, global policies or settings can be selected or defined by accessing appropriate options presented by the interface applications. The global policies are associated with a particular user (e.g., administrator and/or pilot). One global policy includes an auto save feature that automatically saves the profile data instance used by the administrator/pilot when the avionic equipment is powered down and/or modified. Thus, no manual save for a profile data instance is needed when an administrator/pilot activates an auto save feature. Other global policies can include activating an editor application that permits creating and/or editing profile data instances.

In some embodiments, the editor application, allows an administrator/pilot to change values assigned in a profile data instance. In one embodiment, this is done by presenting a fielded table on a display screen, where the columns of the table identify a particular display (e.g., MFD and PFD) of the avionic equipment, and the columns of the table represents display fields within the displays. These fields have defined locations within the displays. The contents of any particular cell of the table, includes desired values by the administrator/pilot. In some instances, the values are identified by short acronyms or are supplied by the editor application from a list of available choices. Some cells of the table can also be used to set the displayed units of measure (e.g., Metric, versus U.S. standard, and the like) for a displayed field. The editing application can also provide input screens to accept flight plans from the pilot, parameter settings for activating timers or alarms within the aircraft, map settings/views, frequency spacing for transceiver communications, navigation configurations, date/time formats, and the like. However, the present invention is not limited to any particular implementation of an editor application, and other techniques can be used without departing from the present disclosure.

With the above presented examples and context, FIG. 1 will now be discussed in detail. Accordingly, at 110, the avionic equipment receives an identifier associated with an instance of profile data. In some embodiments, the identifier is inputted to the avionic equipment, when the identifier was not previously available as depicted at 111. In some embodiments, the all available identifiers that the avionic equipment has stored is presented in a list, which an administrator or pilot uses to select a particular identifier. In still other embodiments, the identifier is automatically transmitted to the avionic equipment through a network (e.g., wireless, physical connection, and the like) and/or through communications with a portable electronic device (e.g., personal digital assistant (PDA), cell phone, and the like). In some cases, the identifier is automatically acquired when log in is required. Thus, when an administrator or pilot logs into the avionic equipment, all available instances of profile data are made available, and the administrator or pilot selects a desired instance.

Once an instance of profile data is selected, then at 120 the identifier and selection are used to acquire the instance of the profile data within the avionic equipment. In one embodiment, the instance is acquired locally within storage accessible to the avionic equipment, as depicted at 121. Moreover, at 122, the instance can be acquired from removable computer readable media, such as a floppy disk, cartridge, compact disk, and the like. Additionally, at 123, the instance can be acquired remotely from over a network and/or a portable electronic device.

When the avionic equipment has acquired the desired instance of profile data, then at 130 the electronic data file is loaded and used to configure the avionic equipment. The configuration can include presenting options/settings at defined locations within the MFD and/or PFD, as depicted at 131. Configuration can also include at 132, defining and using desired units of measure when displaying certain options/settings within the MFD and/or PFD. Furthermore, at 133, configuration can include setting a number of options/settings to desired map settings/views, date/time formats, navigation values, timer/alert values, transceiver communication frequency spacing, desired flight plans, desired waypoints, and/or other communication, navigation, or surveillance settings associated with avionic equipment.

A sample listing of options/settings is provided for illustrative purposes below, this listing is not intended to limit the present invention, since a variety of additional settings/options can be used without departing from the teachings presented herein. Each option/setting can be defined in a schema for the profile data and can include attributes identifying default values. The acronyms used below are well known to one of ordinary skill in the art. Some options/settings include:

CLASS B, CTA (Control Area) Airspace Alarm
Class C, TMA (Terminal Control Area) Airspace Alarm
Tower, Control Zone Airspace Alarm
Restricted Airspace Alarm
MOA (Military Operations Area) and Other Airspace Alarms
Airspace Alarm Altitude Buffer
Arrival Alarm Status
Arrival Alarm-Distance for Alarm in Advance of Destination
Time Display
Time Format
Time Offset
Heading Mode
User Magnetic Variation
Distance Units
Speed Units
Altitude Units
Vertical Speed Units
Pressure Units
Temperature Units
Fuel Units
Fuel Flow Units
Position Fomat
Communication Channel Spacing
Manual Display Backlight Setting
Map Datum Name
PFD & MFD Navigation Bar Fields for fields 1, 2, 3, & 4
Nearest Airport Runway Surface Requirements
Nearest Airport Minimum Runway Length Requirements
Pilot Profile Autosave
Last NDB (Non-Directional Beacon)
Last VOR (Verify High Frequency OmniRange)
Last INT (Intersection)
Last APT
Last USR
Recent APTs
Recent INTs
Recent VORs
Recent USRs
Recent Any Waypoints
Navigation Frequencies-#1 and/or #2 of Navigation Receivers (active and inactive)
Communication Frequencies-#1 and/or #2 of Communication Transceivers (active and inactive)
Weather View
Taws View
Taws Mode
Map Autozoom
Map Orientation
Map Detail
Lightning Strike Mode
NexRad Display Density
Traffic Mode
Aviation Map Data Enabled
Land Map Data Enabled
Topographical Map Data Enabled
Topographical Map Scale Enabled Navigation Compass Enabled
Map Heading Line Enabled
Wind Vector Enabled
CDI (Course Deviation Indicator) Selected
Automatic ILS (Instrument Landing System) CDI Capture
Trip Planning Page Mode
Trip Planning Ground Speed
Trip Planning Fuel/Trip Statistics Mode
Trip Planning Waypoint To
Trip Planning Waypoint From
E6 B Barometric Pressure
E6 B Heading
E6B Indicated Altitude
E6B Temperature
E6Computed Airspeed
Profile Odometer
Profile Timer
Profile User Waypoints
Profile Flight Plans
Daylight Savings Time Mode
Time Zone
Auto Time Zone Enabled
Active Flight Plan Map Range
Active Flight Plan Waypoints Map Range
User Waypoint Map Range
Lat/Long Grid Map Range
Rivers and Lakes Map Range
Large City Map Range
Medium City Map Range
Small City Map Range
Small Town Map Range
Freeway Map Range
Local Highway Map Range
Local Road Map Range
Railroad Map Range
State/Province Map Range
Large Airport Map Range
Medium Airport Map Range
Small Airport Map Range
VOR Map Range
NDB Map Range
Intersection Map Range
Class B/CTA Airspace Map Range
Class C/TMAs Airspace Map Range
Tower/Control Zone Map Range
Restricted Area Map Range
MOA Map Range
Other SUA Map Range
Lightning Strike Map Range
NEXRAD Map Range
Traffic Symbols Map Range
Traffic Labels Map Range
User Waypoint Map Text Size
Active Flight Plan Waypoint Map Text Size
Rivers and Lakes Map Text Size
Large City Map Text Size
Medium City Map Text Size
Small City Map Text Size
Small Town Map Text Size
State/Province Map Text Size
Large Airport Map Text Size
Medium Airport Map Text Size
Small Airport Map Text Size
VOR Airport Map Text Size
NDB Airport Map Text Size
Intersection Airport Map Text Size
Default Navigation Map Zoom Range
Traffic Map Zoom Range
Weather Map Zoom Range
Taws Map Zoom Range
Declutter Value on Default Navigation Map Page
Map Overlay Throughout System
PFD Inset Map Display
PFD Mode
Other user options One of ordinary skill in the art now appreciates, how instances of profile data can be created, activated, modified, and saved according to configured values desired by administrators and/or pilots using avionic equipment of an aircraft. Moreover, the instances of profile data can be portable between aircrafts. Thus, the automatic configuration of avionic equipment can occur with reusable and customized instances of profile data. This eliminates problems associated with conventional techniques where profile data is repetitively and manually entered into avionic equipment each time the avionic equipment is powered off.

Figure 2:
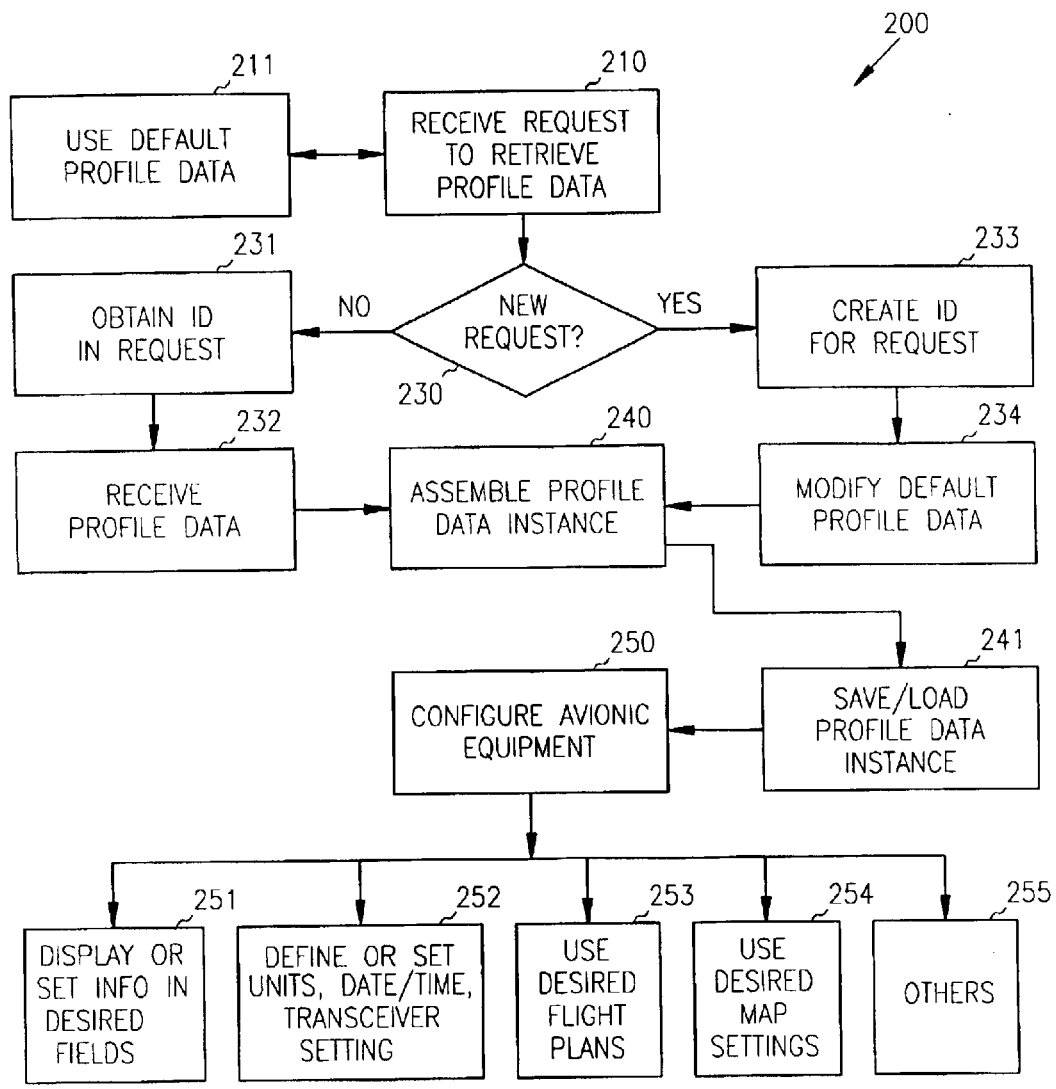
FIG. 2 is a flowchart of another method for configuring profile data in avionic equipment, according to the teachings of the present invention.

FIG. 2 illustrates a flow diagram of another method 200 to configure avionic equipment. At 210, one or more applications processing on the avionic equipment receives a request to retrieve and load an instance of profile data. In some embodiments, a default instance of profile data is initially provided when the avionic equipment is powered up, and the request is to use the default instance, as depicted at 211. Alternatively, in some embodiments, each time the avionic equipment is powered up a default instance of the profile data is provided. The request can be received from an administrator, pilot, network, or portable electronic device.

The profile data includes tags/fields and values. The tags/fields can include default values and attributes used for security purposes. Different sets of values for the tags/fields identify specific unique instances for the profile data. In one embodiment, the policies and syntax of various instances for the profile data are defined by an administratively created schema. The various instances of the profile data is saved as an electronic file, which can be read and processed by the applications executing on the avionic equipment. The specific values included in the electronic file is used to configure display fields on a MFD and/or PFD, define displayed units of measure, define day/time formats, identify desired flight plans, define spacing variations for transceiver communications, set timers, alarms, and/or other communication, navigation, or surveillance settings associated with avionic equipment.

At 230, a check is made by the applications to determine if the received request is for a new request. If no new request is detected, then at 231 an identification for the request is acquired from the request for a specific instance of profile data. Next, at 232, the applications use the identification to acquire the desired specific instance of profile data. In one embodiment, the specific instance is located within storage of the avionic equipment and is thus locally obtained. In other embodiments, the specific instance is downloaded from one or more remote network applications or from applications processing on a portable electronic device in direct communication with the avionic equipment.

However, if at 230, the applications determine that a new request is being made, then, at 234, an editor application is presented to the administrator or pilot. The administrator or pilot interacts with the editor application to provide values for settings/options (e.g., as defined by example above with FIG. 1). In some instances, the editor application present a default profile data instance for user or pilot modification. The default profile data instance can be an existing and desired user or pilot profile data instance. In this way, the administrator or pilot can use templates of existing profile data instances without having to start from scratch with the editor application.

At 240, an instance of the desired profile data is assembled by the applications. In some embodiments, some values identified within the profile data can be pointers (e.g., such as file names to existing flight plans) to local and/or remote files. Thus, at 240, the instance can be assembled from one of more locations. At 241, the instance is loaded and/or saved on the avionic equipment along with its identifier. Next, at 250, the avionic equipment (e.g., MFDs, PFDs, applications, and the like) are configured with the values included in the instance of the profile data.

The result is that the instance of the profile data drives the types of information being displayed on MFDs and/or PFDs at desired screen field locations, as depicted at 251. Furthermore, the instance can be used to set the units of measure, set formats of time/dates, and set spacing for transceiver communication frequencies, as depicted at 252. Also, at 253, any desired flight plans are made available by the avionic equipment, and, at 254, any desired map settings are initialized.

In fact, at 255, any other communication, navigation, and/or surveillance data can be used within the instance of the profile data to customize the displays of the MFD and/or PFDs. Furthermore, data values assigned to the profile data instances can be used to define/set avionic operations (e.g., alarms and the like) and/or define/set displayed units of measure. All such communication, navigation, and/or surveillance data is intended to fall within the scope of the present disclosure.

Thus, the present invention can automatically acquire, load, configure, create, save, modify, and in some cases, if desired, delete, profile data. Conventionally, the process of obtaining profile data has been a repetitive manual process, with little to no reusability. Moreover, in some embodiments, an instance of profile data can be generated from other user-generated instances of profile data. In this way, existing instances of profile data can serve as templates for new instances of profile data. Additionally, in some circumstances, a particular profile instance can be saved as two separate profile instances with different identifiers to uniquely identify the two identical instances.

Figure 3:
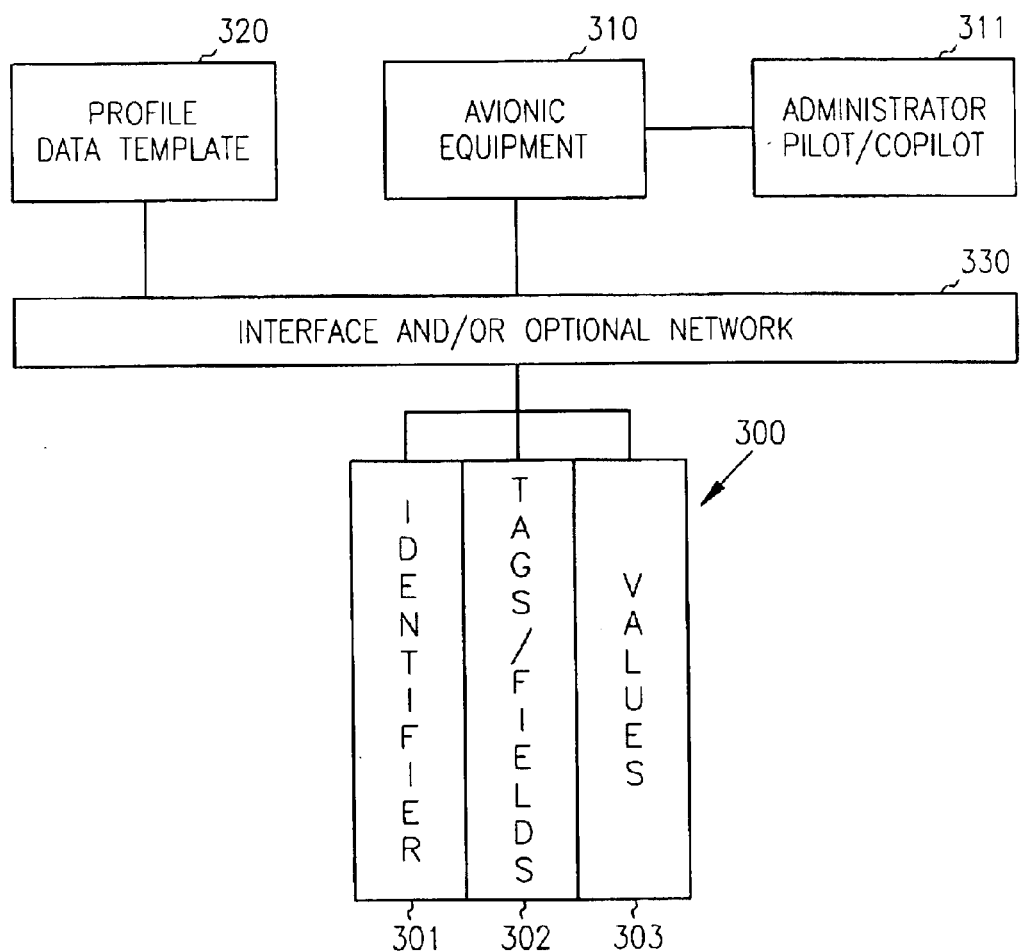
FIG. 3 is a diagram of a profile data structure, according to the teachings of the present invention.

FIG. 3 illustrates a diagram of one profile data structure 300, according to the teachings of the present invention. The profile data structure 300 resides in one or more computer readable media and is accessible to one or more applications that create, modify, or use the profile data structure 300. The profile data structure 300 includes an identifier 301, tags/fields 302 or tag data, and values 303. The profile data structure 300, conforms to a schema which defines the tags/fields 302, and types of available values 303. In one embodiment, the tags/fields 302 can be identified with attributes in the schema such that certain tags/fields 302 are optional and certain tags/fields 302 are required within the data structure 300.

The each tag/field 302 is associated with one or more values 303. The tags/fields 302 combined with values 303, are used by applications processing on avionic equipment 310 to configure displays (e.g., MFDs and PFDs), define units of measure being displayed, identify desired flight plans, identify desired map settings, configure navigation fields, define date/time formats, define spacing between transceiver communication frequencies, set timers/alarms, and the like.

In one embodiment, an administrator or pilot 311 interacts with applications processing on the avionic equipment 310 to modify an existing profile data template data structure 320. Thus, instances of the profile data structure 300 need not be created from scratch by administrators or pilots 311. Also, in other embodiments, the administrator or pilot 311 access one or more menus displayed on the avionic equipment 310 to select an existing identifier 301 that is associated with a desired instance of the profile data structure 300. The displayed menu can be a Graphical User Interface (GUI), Text User Interface (TUI), or Disk Operating System (DOS) User Interface (DUI).

Also, in some embodiments, the identifier 301 can also be associated with a password, if security is desired. Moreover, the profile data structure 300 can be an administratively created read only data structure, such that no modifications can occur to the values 303. However, the administratively created read only data structure can be saved as a new and different instance of the profile data structure 300, if changes are made. Thus, various levels of security can be achieved with the profile data structure 300 by using additional applications that interface use the profile data structure 300.

Furthermore, in some embodiments, the tags/fields 302 and corresponding values 303 can be received over an interface 330. In one embodiment, this interface 330 includes an optional network. The network connection can be wireless or a physical connection. Moreover, the network can include a portable electronic device docked to or in near proximity to the avionic equipment. Alternative, the network can include remote computing devices, such as remote servers, websites, and/or portals.

Therefore, the profile data structure 300 is reusable and portable, such that it can be used by multiple aircraft associated with multiple avionic equipment suites 310. Administrators or pilots 311 can also easily create, modify, retrieve, and use the profile data structure 300 of the present disclosure. This represents improvements over conventional techniques, which require repetitive manual creation of settings/options for avionic equipment each time avionic equipment is powered up.

Figure 4:
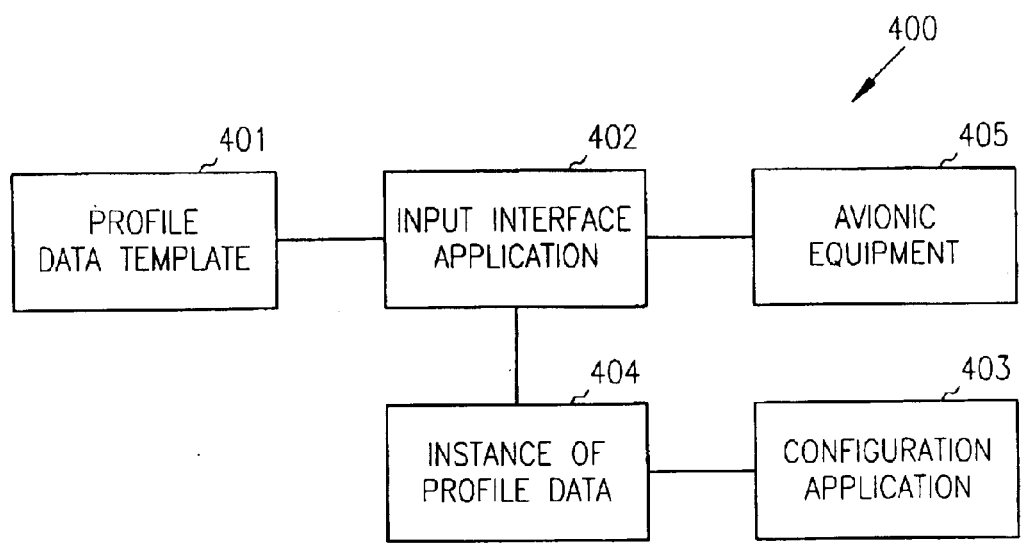
FIG. 4 is a diagram of a system to configure avionic equipment, according to the teachings of the present invention.

FIG. 4 illustrates a diagram of one system 400 to configure avionic equipment. The system 400 includes a profile data template 401, an input interface application 402, and a configuration application 403. The system 400 is implemented in a computer readable medium having access to memory (e.g. volatile and/or non-volatile) and one or more processors for processing the applications 402–403.

The profile data template 401 represents an initial schema for instances of profile data 404. The profile data template includes an identifier, tags/fields and associated values for each of the tags/fields. The tags/fields and corresponding values permit the configuration application 403 to configure avionic equipment 405. Some customizations that can be achieved with the values include configuring MFDs and/or PFDs with settings/options in specific screen field locations, defining displayed units of measure, defining date/time formats, loading and identifying flight plans, loading and identifying map settings, loading navigation settings/options, defining frequency spacing for transceiver communications, defining timers, alarms, and/or other communication, navigation, or surveillance settings associated with avionic equipment 405.

The input interface application 402 is used by an administrator or pilot to define instances of profile data 404 by initially using the profile data template 401. The input interface application 402 is also used by administrators or pilots to store, activate, and retrieve specific instances of the profile data 404. In one embodiment, the input interface application 402 presents the profile data template 401 as a fielded table to administrators or pilots. The cells of the fielded table are modifiable and accept tag/field values from the administrators or pilots. In one embodiment, some cells are restricted for security, standards, or safety issues and therefore cannot be modified. Also, in some embodiments, the input interface application 401 interactively receives modifications to the profile data template 401 when creating desired instances of the profile data 404 for administrators or pilots. In other embodiments, the input interface application 401 uses an identifier to locally or remotely acquire an instance of the profile data 404 on behalf of the configuration application 403.

One of ordinary skill in the art, now appreciates upon reading and comprehending the present disclosure how administrator/pilots of aircraft can easily and portably create, modify, retrieve, and activate desired profile data. The profile data is then automatically processed to configure avionic equipment within an aircraft. Thus, repetitive manual input is no longer required as is the case with conventional techniques.

CONCLUSION

The above methods, data structures, and systems have been described, by way of example and not by way of limitation, with respect to improving overall configuration and customization techniques for avionic equipment using profile data. That is, the methods, data structures, and systems provide efficient techniques for associating, creating, modifying, storing, and retrieving instances of profile data for avionic equipment.

Once an instance of the profile data is properly retrieved and/or defined, the avionic equipment is configured using values associated with instances. In this way, administrators, pilots, and/or copilots can create, modify, store and load their profile data independent of any previous used instances of the profile data within the avionic equipment. This saves considerable set-up time that is typically expended to configure the avionic equipment in a desired fashion by the administrator, pilot, and/or copilot. Moreover, standards can be better enforced by the administrator, such that some settings/options identified within instances of the profile data are globally enforced and/or not modifiable by any particular pilot and/or copilot.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices, functional data, and methods are used. The scope of the invention should be determined with reference to the appended claims, along with the full scope of equivalents to which such claims are entitled.

What is claimed is:

1. A profile data structure residing on a computer-readable medium operable to be used to configure avionic equipment, comprising:
   an identifier to uniquely identify an instance of the profile data structure; and
   tag data associated with values within the instance, wherein the tag data combined with the associated values is used to configure one or more display fields of the avionic equipment, identify units for one or more of the display fields, identify flight plans, define map settings, define communication transceiver spacing, define date/time setup, set navigation fields, and/or define one or more timers or alarms associated with the avionic equipment.

2. The profile data structure of claim 1, wherein the profile data structure is created using a template.

3. The profile data structure of claim 1, wherein the identifier is acquired from a menu associated with a graphical user interface operating on the avionic equipment.

4. The profile data structure of claim 1 further comprising a password associated with the identifier and used to securely access the instance of the profile data structure.

5. The profile data structure of claim 1, wherein the avionic equipment includes displays, navigation devices, avionic devices, communication devices, surveillance devices, and applications processing on the devices.

6. The profile data structure of claim 1, wherein the tag data and the associated values are wirelessly transferred to the avionic equipment in order to configure the avionic equipment.

7. The profile data structure of claim 1, wherein the instance of the profile data structure is an initial administrative profile data structure which if modified is associated with a different identifier and correspondingly a different instance of the profile data structure.

8. The preference data structure of claim 1, wherein a number of available values for the tag data are not permitted to be associated with the tag data.

9. A system to configure avionic equipment, comprising:
   profile data template;
   an input interface application for defining an instance of profile data using the profile data template, storing the instance, and retrieving the instance; and
   a configuration application that uses the instance of the profile data to configure one or more display fields of the avionic equipment, identify units for one or more of the display fields, identify flight plans, define map settings, define communication transceiver spacing, define date/time setup, set navigation fields, and/or define one or more timers or alarms associated with the avionic equipment.

10. The system of claim 9, wherein a number of values within the profile data template are identified as being required and cannot be altered in the instance by the input interface application.

11. The system of claim 9, wherein the input interface application is accessed by at least one or an administrator, a pilot, and a copilot.

12. The system of claim 9, wherein the input interface application presents the profile data template as a fielded table for modification.

13. The system of claim 12, wherein the input interface interactively receives modifications that define the instance.

14. The system of claim 12, wherein the input interface retrieves the instance representing changes for the profile data template from an electronic file, and the file is local and/or remote from the avionic equipment.

* * * * *